United States Patent [19]
Thiessen et al.

[11] Patent Number: 5,703,742
[45] Date of Patent: Dec. 30, 1997

[54] UNIVERSAL CASSETTE CARTRIDGE

[75] Inventors: Jeffrey S. Thiessen, Champlin; John M. Enga, Crystal; Hector F. Gonzalez, Rochester, all of Minn.

[73] Assignee: Geneva Group of Companies, Inc., Minneapolis, Minn.

[21] Appl. No.: 741,570

[22] Filed: Oct. 31, 1996

[51] Int. Cl.⁶ ............................................................ G11B 5/41
[52] U.S. Cl. ........................................... 360/132; 360/128
[58] Field of Search .................................. 360/132, 128, 360/137, 60

[56]                References Cited

U.S. PATENT DOCUMENTS 4,751,600  6/1988  Cecil et al. .......................... 360/137 X
4,984,119  1/1991  Backlund et al. .................. 360/132 X
5,541,794  7/1996  Griffen et al. ......................... 360/128

*Primary Examiner*—John H. Wolff
*Attorney, Agent, or Firm*—Moore & Hansen

[57]            ABSTRACT

A tape driving cleaning cartridge having a housing with recognition openings, a slide mechanism slidably movable to cover one recognition opening while leaving the other open. The slide mechanism is manually movable between the two positions. If additional recognition openings are employed, multiple slide mechanisms may be used.

6 Claims, 2 Drawing Sheets

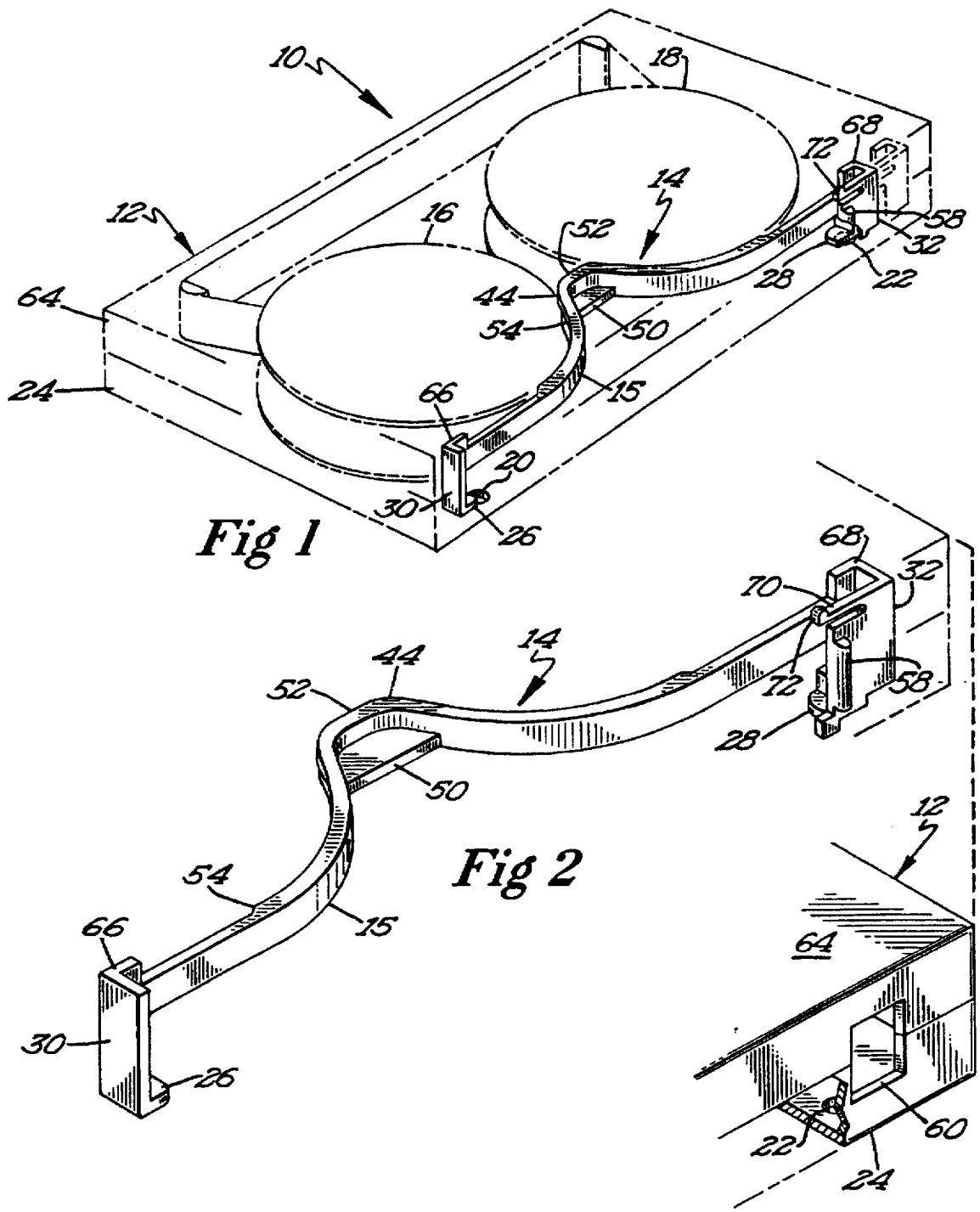

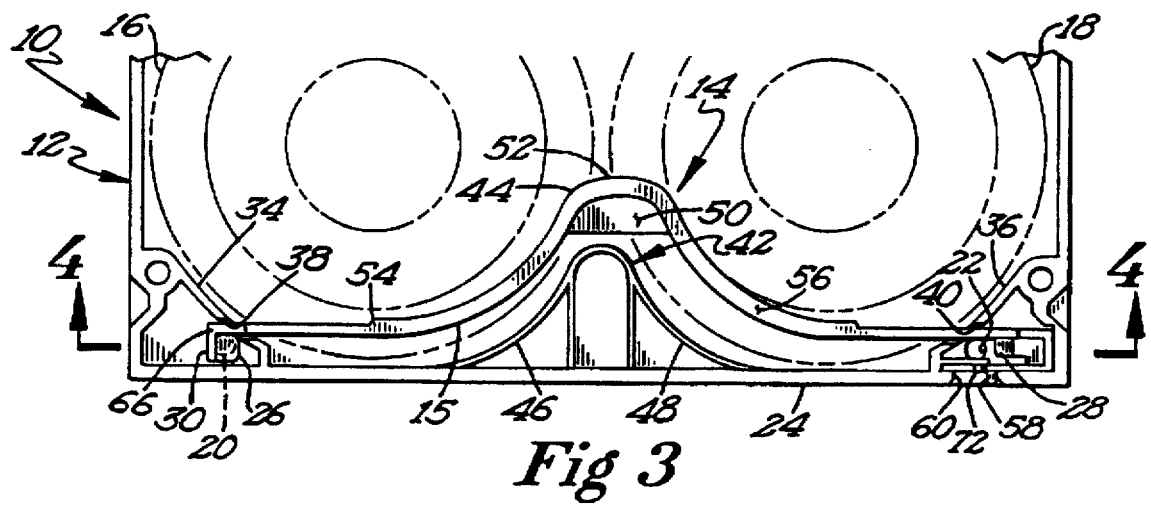

UNIVERSAL CASSETTE CARTRIDGE

BACKGROUND OF THE INVENTION

The present invention relates generally to magnetic recording or to cleaning tapes. Specifically it relates to tape drive cleaning tapes and cassettes.

In the tape drive field, many manufacturers compete to provide tape drives. These tape drives are used for a variety of applications such as computer back-up and data storage. Each specific tape drive has its own firmware which controls the functions of the drive, according to a set hierarchy of commands. Firmware programming is tailored to the hardware configurations of the drives themselves.

The result is that tape drive cartridges, while having similar physical configurations, have operational parameters and differences in recognition schemes for cleaning and backup purposes which vary depending on the tape drive for which they are designed. For example, cassette cartridges for computer back-up drives have a plurality of recognition openings along the bottom of the cartridge. The configuration of the recognition openings is standard. However, since the tape drives use a variety of different command firmware, use of the cassette cartridge openings varies by manufacturer. Various manufacturers use a variety of configurations of closed and open recognition openings which the firmware and drive hardware use to determine the presence of a cleaning tape. If the appropriate configuration of open and closed openings is present, the drive recognizes the cartridge as a cleaning tape and initiates a cleaning sequence. Since there are a variety of configurations to choose from, a variety of configurations for cleaning tapes are used.

The tape drives may use pins or probes which extend into the recognition holes to determine which holes are open or closed when a cartridge is inserted into the tape drive. When the recognition openings are unobstructed, the pin or probe extends into the housing.

Because of the variation in use of the recognition openings between various tape drives, a cleaning cartridge is limited in its available use to the specific drive for which it is designed. In other words, the configuration of the open and closed recognition openings in a cleaning cartridge must be matched with the specific tape drive in which the cartridge is to be used, or the cleaning tape will not be usable in that drive. In common practice, recognition holes are left closed or open during the cassette molding process, creating a single drive cartridge for use with only one brand of drive.

In order for a user to purchase a cleaning tape, therefore, the user must know specifically the tape drive type and manufacturer when purchasing a cleaning tape. Confusion between various cleaning tapes is a good possibility. Since cleaning tapes are dedicated to the drive for which they were designed, the user may need to purchase multiple cleaning tapes if multiple drives are used. Further, any user switching between different types of drives, because of the purchase of a new drive or the changing of a machine to a different machine in an office or the like will likely not be able to use the same cleaning tape the user already has in the new drive.

It would be desirable to provide a cleaning tape and cartridge that may be used in any tape drive regardless of the configuration of the recognition openings required by the drive firmware and hardware to determine the presence of the cleaning tape. It would further be desirable to provide a cleaning tape that may be configured to work in any tape drive, and which may be multiply reconfigured to work in a tape drive of a different type.

It has been suggested that a cleaning cartridge could be made having punch-out recognition hole openings. If such a cartridge were made, the user could select the appropriate open and closed recognition opening configuration for the tape drive and punch out the appropriate openings. There are several drawbacks to this type of cartridge. While it may be universal in the sense that it can be configured for use with any tape drive, such a cleaning tape is only configurable once. After the one configuration, the cleaning tape is useable only in drives having the chosen configuration for recognition hole openings. Further, the punch-outs will have a tendency to be deposited into the tape drive, where they could eventually obstruct the cleaning process, damage the cleaning tape, tape drive, or any combination of the above.

It would therefore also be desirable to provide a universal cleaning cartridge without punch out parts which could damage the cleaning tape or the tape drive.

BRIEF SUMMARY OF THE INVENTION

The present invention overcomes the problems of the prior art, and provides a universal tape cleaning cartridge which may be configured and reconfigured for application with any commercial tape drive. The present invention accomplishes this by providing a cleaning cartridge with its two traditional recognition openings left open during the manufacturing process. A slide mechanism is positioned within the cartridge housing, and is selectably movable between several positions within the cartridge to alternatively close and open various recognition openings. The choice of open versus closed recognition holes is dependent upon the recognition hole configuration accepted by the tape drive in which the present invention will be used.

To use the cleaning cartridge of the present invention in drives of different types and made by different manufacturers, all that must be effected by the user is the appropriate positioning of the slide mechanism to open or close the appropriate recognition openings.

The slide mechanism of the present invention is situated within a slightly modified cartridge housing in a position which will not interfere with the normal operation of a standard cartridge. The slide mechanism is movable between a first position in which an extending recognition control tab on the slide mechanism blocks a first recognition hole, and the second recognition hole is left open, and a second position in which another recognition control tab, extending from the opposite end of the slide mechanism, blocks the second recognition hole, while the first recognition hole is left open.

The slide mechanism is molded so as to fit into a slightly modified cassette cartridge with its recognition control tabs adjacent the recognition openings. The central portion of the slide mechanism is positioned between the hubs of the cartridge. A movement tab on the slide mechanism extends through an opening in the cartridge. This movement tab is employed by the user to change the position of the recognition control tabs of the slide mechanism to alternately cover and uncover the appropriate recognition holes for recognition of the universal cleaning cartridge by the specific drive for which it has been configured. The slide mechanism is of sufficient rigidity that it will maintain its shape when adjusted by using the movement tab.

A standard cassette cartridge may be used for the universal cleaning cartridge with only slight modification. Support walls within the cartridge have openings cut therein to allow the slide mechanism to move freely between its positions. If not already present, a movement tab opening may be molded into or cut from the cassette cartridge. All of these changes may readily be accomplished in the molding process. The two recognition openings left open in the molding process are the two most openings commonly used in the recognition process. However, if different recognition openings are used at a later time, different recognition openings could also be left open.

The slide mechanism, as has been mentioned, has recognition control tabs adjacent each of its opposite ends. These recognition control tabs are positioned and configured so that when the slide mechanism is in its first position, one of the recognition holes is covered and the other recognition hole is open. In the second position, the open and closed recognition holes are reversed. The ends of the slide mechanism are approximately equal in height to the interior height of the housing so that probes or pins used by the drive do not push the recognition control tabs aside. When the recognition control tabs do not cover a recognition opening, the pins or probes are free to extend into the housing.

Presently, there are two major configurations of recognition openings used in the tape drive industry. Other configurations could be employed. The universal cleaning cartridge could easily be adapted to conform to other configurations by a simple arrangement of recognition control tabs. In this manner, multiple configurations could be employed by the universal cleaning cartridge. The present invention would not be limited to use with only two configurations of the recognition openings. For example, if multiple recognition holes at each of the two opposite ends of a cartridge were used in a recognition pattern, the slide mechanism of the present invention could be reconfigured to block off or leave open any or all of the recognition openings.

Similarly, two or more slide mechanisms could be employed, each operating to configure at least one set of recognition openings. In this configuration, each slide mechanism could have its own recognition control tab or tabs and movement tab, and would move independently from the other slide mechanism. This independent motion would allow for a much greater use of the slide mechanisms in terms of the variety of configurations allowed for use in recognition of not only cleaning tapes, but recording tapes and prerecorded tapes as use in recognition of not only cleaning tapes, but recording tapes and prerecorded tapes as well. In this sense, the present invention is not limited to cleaning cartridges, but may be employed in other tape applications which utilize the recognition openings of cartridges.

These and other objects and benefits of the present invention will become apparent from the following detailed description thereof taken in conjunction with the accompanying drawings, wherein like reference numerals designate like elements throughout the several views.

DESCRIPTION OF THE DRAWINGS

FIG. 1 is a perspective view of an embodiment of the present invention;

FIG. 2 is a perspective view of an embodiment of a slide mechanism of the present invention;

FIG. 3 is a top elevation view of an embodiment of the present invention showing one recognition hole blocked and the other open;

FIG. 4 is a section view of the embodiment of FIG. 3 taken along lines 4—4 thereof; and FIG. 5 is a top elevation view of the embodiment show in FIG. 3 with the blocked and open recognition holes switched.

DESCRIPTION OF THE PREFERRED EMBODIMENT

Referring now to the drawings, an embodiment of the universal cassette cartridge 10 may be seen in perspective. Universal cassette cartridge 10 includes a housing 12 and a slide mechanism 14. Housing 12 contains standard supply reel 16 and takeup reel 18, along with other components used in cleaning tape applications. Such cleaning tape elements are known in the art and will not be described herein. Any of a number of tape configurations may be employed with the universal features of the present invention to provide the user with universal cassette cartridge 10. This is due to the use of the slide mechanism 14 of the present invention, which is usable with a wide variety of cleaning tape configurations. Universal cassette cartridge 10 is preferably used as a cleaning cartridge, with slide mechanism 14 configured to allow recognition of the cassette as a cleaning cassette. However, the principles of recognition employed in the present invention may be used successfully with other recognition applications, such as prerecorded tapes and the like.

Housing 12 has a series of two recognition openings 20 and 22 in its bottom 24. More recognition openings may be present in the housing 12, but are not shown in the figures for clarity. Although such other recognition openings are not presently used for recognition purposes in the tape drive industry, they may be so employed in the future. The present invention concepts are readily applicable to use with recognition openings other than shown openings 20 and 22.

Slide mechanism 14 has recognition control tabs 26 and 28, a recognition control tab at each end 30 and 32 of slide mechanism 14. Recognition control tab 26 at slide mechanism end 30 extends from body 15 of slide mechanism 14 so that if properly positioned, recognition control tab 26 will obscure recognition opening 20. At the same time, with slide mechanism 14 positioned so that recognition control tab 26 will obscure recognition opening 20, recognition control tab 28 extending from body 15 at opposite end 32 of slide mechanism 14 will not obscure recognition opening 22.

Slide mechanism 14 is slidably movable between a first position shown in FIG. 3 and a second position shown in FIG. 5. In the first position shown in FIG. 3, slide mechanism 14 is positioned within housing 12 so that recognition control tab 26 at end 30 of slide mechanism 14 will obscure recognition opening 20 but recognition control tab 28 at end 32 of slide mechanism 14 will not obscure recognition opening 22. When the slide mechanism 14 is slidably moved from the position shown in FIG. 3 to the position shown in FIG. 5, recognition control tab 28 at end 32 of slide mechanism 14 will obscure recognition opening 22, but recognition control tab 26 at end 30 of slide mechanism 14 will not obscure recognition opening 20. The second position of slide mechanism 14 is also shown in FIG. 1, with the first position of end 32 shown in phantom.

Tape drive manufacturers use the recognition openings 20 and 22 to determine whether a cartridge inserted into the tape drive is a cleaning cartridge or a different type of cartridge. The method for accomplishing this determination is through probes or pins 21 that extend from the tape drive, and which are aligned so that the probe or pin 21 will extend through a specified recognition opening if the recognition opening is present when the probe is extended. The configuration of open and shut recognition openings in the cartridge inserted into the drive is compared to the configurations programmed into the firmware that controls the drive in order to determine whether the cartridge is a cleaning cartridge or not. For example, if a tape drive is programmed to recognize a cartridge as a cleaning cartridge when recognition opening 20 is clear and recognition opening 22 is obscured, then the configuration of the universal cassette cartridge 10 shown in FIG. 5 will be recognized as a cleaning cartridge, and the appropriate cleaning functions will be initiated by the drive. Conversely, if the tape drive recognizes a cartridge as a cleaning cartridge when the recognition opening 20 is obscured and the recognition opening 22 is clear, then the configuration of the universal cleaning cartridge shown in FIG. 3 will allow recognition of the universal cleaning cartridge 10 as a cleaning cartridge by the drive. As has been mentioned, adaption of the present invention to cover or uncover other recognition openings or a different configuration of present recognition openings is envisioned but not shown. Such adaption is well within the purview of the invention.

Slide mechanism 14 is constructed so as to minimize the changes that must be made to a standard housing in order to allow the housing to be used for a universal cleaning cartridge. Standard cartridge housings have support walls extending from the bottom to the top of the housing within the housing. These support walls serve to help prevent the housing from collapsing under pressure. The walls provide stability for the cartridge as well. In a standard cartridge housing, the support walls extend from the top to the bottom of the housing in various places to provide stability and strength to the housing.

In the present invention, the walls 34 and 36 of housing 12 each have a slot, 38 and 40 respectively, cut into them to allow the slide mechanism 14 to pass therethrough. Since standard housings also have supply and takeup reels such as reels 16 and 18, and a central support structure 42 located between the recognition openings such as openings 20 and 22, the slide mechanism 14 is preferably shaped so as to avoid contact with the support structure 42 as is best shown in FIGS. 3 and 5. In FIG. 3, with slide mechanism 14 in its first position so that recognition control tab 26 obscures recognition opening 20, a central bend 44 in body 15 of slide mechanism 14 is closest to central support structure 42 at the left side support wall 46 of central support structure 42. When slide mechanism 14 is moved to its second position as best shown in FIG. 5, central bend 44 in body 15 of slide mechanism 14 is closest to central support structure 42 at the right side support wall 48 of central support structure 42. Of course, slide mechanism 14 may be shaped to accommodate its placement in any housing used for a cartridge. Similarly, a central support structure such as central support structure 42 may be modified as support walls 34 and 36 are modified, by cutting or molding a notch or slot therein.

Referring now to FIG. 2, slide mechanism 14 may be seen in greater detail. Slide mechanism 14 is preferably molded from a material sufficiently rigid so as to allow slide mechanism 14 to be movable in the housing 12 without bending significantly. To this end, slide mechanism 14 has strength and rigidity enhancing features added. At bend 44 of body 15, a bracing shelf 50 extends across the peak 52 of bend 44, on the concave side of bend 44. This bracing shelf 50 provides the bend 44 and body 15 resistance from bending when pressure is applied to move the slide mechanism between its first and second positions. A lip 54 along top 56 of slide mechanisms 14 serves also to enhance the strength of slide mechanism 14, especially against bending. Lip 54 preferably extends approximately two-thirds of the length of slide mechanism 14, and spanning central bend 44.

Slide mechanism 14 has movement tab 58 positioned thereon so that movement tab 58 extends through movement tab opening 60 of housing 12. A user may use movement tab 58 to move slide mechanism 14 between its first and second positions. Movement tab opening 60 is shown in its preferred position on housing 12. However, movement tab opening 60 may be positioned anywhere movement tab 58 is positioned with equal results. Alternatively, movement tab 58 and movement tab opening 60 may be replaced with a variety of configurations which will allow slide mechanism 14 to be moved between its first and second positions. Examples of such configurations (not shown) include but are not limited to geared movement of slide mechanism 14, spring action motion of slide mechanism 14, and electric operation. Such schemes are generally more complex and more expensive then the preferred movement tab 58 and movement tab opening 60.

Referring now to FIG. 4, ends 30 and 32 of slide mechanism 14 are seen in greater detail. Ends 30 and 32 are configured to be nearly equal to the interior height 62 of housing 12. Since probes or pins 21 are used to determine the presence or absence of a clear recognition opening such as opening 20, a simple tab such as recognition control tab 26 may be insufficient to block a recognition opening such as opening 20. If end 50 did not extend nearly from bottom 24 to top 64 of housing 12, probe or pin 21 could push recognition control tab 26 away from opening 20, causing the firmware of the tape drive to believe that opening 20 was clear when in fact it was blocked. Since ends 30 and 32 extend nearly from bottom 24 to top 64 of housing 12, probe or pin 21 will be unable to push recognition control tabs 26 and 28 away from openings 20 or 22 respectively. Top 66 of end 30 will abut top 64 of housing 12, allowing recognition control tab 26 to remain in its position covering opening 20. Similarly, recognition control tab 28, when it is coveting opening 22, will remain coveting opening 22 when top 68 of end 32 abuts top 64 of housing 12.

Alternatively, support extensions could extend between the top 64 and bottom 24 of the housing 12 in blocking juxtaposition to the recognition control tabs 26 and 28 to prevent displacement of the tabs from their positions covering the recognition openings 20 or 22.

Preferably, universal cassette cartridge 10 has means for holding slide mechanism 14 in its first and second positions. This holding means is shown in detail in FIGS. 2 and 4. As shown, end 32 of slide mechanism 14 has cantileverly mounted spring arm 70 adjacent its top 68. Spring arm 70 has protuberance 72 extending therefrom. As best seen in FIG. 4, spring arm 70 is situated nearly at the top 64 of housing 12, and protuberance 72 abuts top 64, placing spring arm 70 under tension. This tension, which is constantly present, holds slide mechanism 14 in position enough so that it does not freely move between positions without out side assistance.

Slide mechanism 14 is shown with its preferred configuration, having a central bend 44 and reinforcing shelf 50 for lateral stability. However, slide mechanism 14 could be made straight, without central bend 44. In this alternative embodiment, housing 12 would need to be modified by cutting slots or openings in central support structure 42 side walls 46 and 48, similar to notches or slots 38 and 40 in side walls 34 and 36.

Presently, tape drives and cassettes use only two recognition openings for determining whether the cassette is a cleaning tape or other type of tape. More or different recognition openings could be used at a later time. The principles of the present invention are easily applicable to multiple recognition opening use. For example, if additional recognition, openings are used for cassette recognition additional recognition control tabs and positions could be added to slide mechanism 14. Alternatively, multiple movement tabs and movement tab openings could be provided for multiple slide mechanisms, with each slide mechanism moving independently. Such a configuration would allow multiple recognition opening configurations and recognition control tab arrangement, to cover all possible recognition opening arrangements.

The detailed description outlined above is considered to be illustrative only of the principles of the invention. Numerous changes and modifications will occur to those skilled in the art, and there is no intention to restrict the scope of the invention to the detailed description. The preferred embodiments of the invention having been described in detail the scope of the invention should be defined by the following claims.

What is claimed is:

1. A universal tape drive cleaning cartridge, comprising:

a housing having a top and a bottom, said bottom having first and second recognition openings spaced apart along a side of said housing; and a slide mechanism having first and second tabs at spaced apart locations thereon, said slide mechanism slidably movable between a first position in which said first tab covers said first recognition opening and said second recognition is unobstructed, and a second position in which said second tab covers said second recognition opening and said first recognition opening is unobstructed.

2. A universal tape drive cleaning cartridge as described in claim 1, wherein:

said housing has a movement tab opening; and said slide mechanism has a movement tab extending therefrom at said movement tab opening, whereby movement of said slide mechanism between said first and said second positions may be effected by moving said movement tab.

3. A universal tape drive cleaning cartridge as described in claim 1, and further comprising:

first and second support extensions which extend between the top of said housing and said bottom of said housing in blocking juxtaposition to one of the tabs to prevent displacement of each tab when in its opening covering position.

4. A universal tape drive cleaning cartridge as described in claim 1, wherein:

said slide mechanism has first and second support extensions, said first support extension positioned adjacent said first tab and said second support extension positioned adjacent said second tab;

wherein each said support extension extends substantially from said top of said housing to said tab to prevent displacement of each tab when in its opening covering position.

5. A universal tape drive cleaning cartridge as described in claim 1, wherein:

said recognition openings are positioned at opposite ends of said housing; and said tabs are positioned at opposite ends of said slide mechanism.

6. A universal tape drive cleaning cartridge as described in claim 1, wherein:

said slide mechanism has a reinforcing shelf located approximately midway between its ends, said reinforcing shelf strengthening said slide mechanism.

* * * * *

UNITED STATES PATENT AND TRADEMARK OFFICE
CERTIFICATE OF CORRECTION

PATENT NO. : 5,703,742
DATED : December 30, 1997
INVENTOR(S) : Thiessen, et. al.

It is certified that error appears in the above-indentified patent and that said Letters Patent is hereby corrected as shown below:

At col. 6, line 33, delete "coveting" and insert --covering--.

At col. 6, line 34, delete "coveting" and insert --covering--.

At col. 7, line 28, after "recognition" insert --opening--.

Signed and Sealed this

Thirtieth Day of June, 1998

Attest:

Attesting Officer

BRUCE LEHMAN
Commissioner of Patents and Trademarks